2,836,512

CYANOETHYLATED STARCH SOLUTIONS

Thomas E. Sample, Jr., La Marque, Tex., assignor to Monsanto Chemical Company, St. Louis, Mo., a corporation of Delaware No Drawing. Application October 18, 1956
Serial No. 616,616

18 Claims. (Cl. 117—65)

This invention relates to novel compositions of matter having particular utility in the coating arts. More particularly it relates to colloidal solutions of cyanoethyl ethers of starch in demethyl sulfoxide and their use in impregnating cellulosic materials.

Starch-water mixtures are commonly used as impregnants for cellulosic materials such as cloth and paper. The resultant starch-coated cellulosic material is susceptible to attack by microorganisms, water and other solvents. To eliminate this deficiency, it is common practice to further treat such starch-impregnated cellulosic materials with another impregnant for the purpose of decreasing the susceptibility of the cellulosic product to deterioration due to the attack of water, other solvents, and microorganisms. This double impregnation technique is obviously costly.

The cyanoethyl ethers of starch are well known in the art. Those containing a degree of substitution of from 1.5 to 2.0, that is, from about 1.5 to 2.0 cyanoethyl ether groups per glucose unit, are extremely resistant to attack by microorganisms, water and other solvents. Due to the insolubility of such cyanoethyl ethers of starch in water and common organic solvents, however, it has not been possible to satisfactorily impregnate cellulosic materials with these cyanoethyl ethers of starch according to methods heretofore used.

It is an object of this invention to provide novel solutions of cyanoethyl ethers of starch. It is a further object of the invention to provide colloidal solutions of cyanoethyl ethers of starch which can be admixed with water. It is a still further object of the invention to provide cellulosic materials impregnated with cyanoethyl ethers of starch and a process for producing such impregnated cellulosic materials. Other objects and advantages will become apparent from the description of the invention.

It has now been discovered that cyanoethyl ethers of starch containing from 1.5 to 2.0 cyanoethyl ether groups per glucose unit form true colloidal solutions either in dimethyl sulfoxide alone or in mixtures of dimethyl sulfoxide and water, the amount of water present being dependent upon the number of cyanoethyl ether groups per glucose unit in the starch with the maximum amount of water present varying from about 25% for a starch containing about 2.0 cyanoethyl ether groups per glucose unit to about 30% for a starch containing about 1.5 cyanoethyl ether groups per glucose unit. This compatibility with water of cyanoethylated starch-dimethyl sulfoxide solutions, or sols, offers many advantages. First, of course, is the economy in solvent usage which it makes possible. In addition to this consideration, is the fact that it provides a ready and simple technique for control of viscosity, "tack," and drying rates in processes where the solutions find application.

The solubility of cyanoethylated starch in dimethyl sulfoxide and the water compatibility of colloidal solutions of cyanoethylated starch in dimethyl sulfoxide was determined by a series of simple tests. Varying quantities of cyanoethyl ethers of starch having different degrees of substitution were weighed to the nearest 0.05 g. and placed in separate 250-ml. flasks. To each of these was added 75 ml. (82.5 g.) of dimethyl sulfoxide, care being taken during the operation to prevent exposure to the atmosphere because of the hygroscopic nature of this solvent. The flasks were then attached to a Boerner shaker and agitated until homogeneous solutions were effected in all of them. For cyanoethylated starch containing about 2.0 cyanoethyl ether groups per glucose unit, solutions containing up to 10% by weight of the substituted starch were pourable ranging from a pale amber-colored, somewhat viscous liquid to a dark, straw-colored, syrup, but those containing more than 10% were either too stiff to pour or formed a gel. With cyanoethylated starch containing about 1.8 cyanoethyl ether groups per glucose unit, it was possible to prepare fluid colloidal solutions having up to 20% by weight of the substituted starch dispersed in the dimethyl sulfoxide; those containing up to 10% were of a thin consistency, while those containing above 10% were syrupy. Solutions of cyanoethylated starch containing about 1.5 cyanoethyl groups per glucose unit in amounts up to 10% by weight were syrupy in consistency and when the amount of starch was increased up to 20% these solutions gradually became too viscous to pour. They ranged from colorless to a light yellow.

The compatability with water of all of the solutions mentioned above was determined. Duplicate samples were titrated with distilled water in a system closed from the atmosphere to establish the maximum concentration of water in the solvent mixture at which irreversible precipitation occurred. Results are indicated in the following table:

*Compatability of the cyanoethylated starch-dimethyl sulfoxide system with water*

| D. S.* of Cyanoethyl Starch Ether | Range of Wt. Percent Water Based on Water-Dimethyl Sulfoxide Mixture Within Which Stable Colloidal Sols Exist |
| --- | --- |
| 1.95 | 0–25%. |
| 1.78 | 0–27%. |
| 1.51 | 0–30%. |

*Cyanoethyl ether groups per glucose unit.

Any amount of water within these limits may be safely added to a colloidal solution of cyanoethylated starch of the degree of substitution indicated in dimethyl sulfoxide without affecting the stability of the solution. Amounts of water in excess of those specified, however, will result in irreversible flocculation in the system. From the standpoint of the invention, the critical factor in this ternary system is the ratio of water to dimethyl sulfoxide and not the concentration of the cyanoethylated starch. Experimental results indicate that as the number of cyanoethyl ether groups per glucose unit varies, the amount of water which can be tolerated in the colloidal solution without affecting its stability also varies. As the degree of substitution increases, the maximum tolerable limits of water in the system decreases. Within the limits of this invention, the maximum amount of water in water-dimethyl sulfoxide mixtures used to prepare colloidal sols of cyanoethylated starch having a degree of substitution of about 2.0 cyanoethyl ether groups per glucose unit is 25%. A mixture of water and dimethyl sulfoxide used to prepare a colloidal sol of a cyanoethyl ether of starch containing about 1.5 cyanoethyl ether groups per glucose unit must contain an amount of water below the maximum amount of about 30%.

The colloidal solutions of the invention are easily prepared. The cyanoethyl ether of starch is merely mechanically dispersed in dimethyl sulfoxide itself or in a mixture of dimethyl sulfoxide and water by means of a conventional shaker, stirrer, blender, or the like. Particle size of the cyanoethylated starch is not critical but the finer the mesh the more easily and quickly is the dry material dispersed in the liquid. Dry cyanoethylated starch ground to a size between 20 and 60 mesh is usually satisfactory, but material having an average particle size of around 40 mesh is preferred. The substituted starch need not be dried for that matter. Equally suitable for use is the "dough" from the cyanoethylation reaction. This can be cut into small pieces and added to the dimethyl sulfoxide or the dimethyl sulfoxide-water mixture in a suitable mixing vessel such as a rotary electric churn, for example, and beaten. When the dough is used, allowance is made, of course, for its occluded water content and the proportions of water and dimethyl sulfoxide in the water-dimethyl sulfoxide mixture are adjusted accordingly.

While the foregoing results were obtained using cyanoethyl ethers of corn starch, cyanoethyl ethers of sago, tapioca, potato, wheat, or rice starches can also be used. Also the invention is not to be considered as limited to cyanoethyl ethers of starch having a maximum of 2.0 cyanoethyl groups per glucose unit but is equally adaptable to substituted starches containing more than two cyanoethyl ether groups per glucose unit and those on up to the fully cyanoethylated product having three cyanoethyl ether groups per glucose unit.

The colloidal solutions of the invention can be used to impregnate cellulosic materials rendering them less susceptible to deterioration due to attack by water, other solvents, and microorganisms. In accordance with this invention, improved cellulosic products are obtained by impregnating the cellulosic material with the colloidal solutions of the invention, drying the impregnated cellulosic material, and then usually calendering the cellulosic maeterial. Cellulosic materials that can be impregnated by the process of this invention include paper and fabrics, particularly woven cotton fabrics suitable for use as tracing cloth, holland cloth and the like. The following examples illustrate this process:

EXAMPLE I

A colloidal solution is prepared containing approximately 8.5% by weight of a cyanoethyl ether of starch having a degree of substitution of 1.95 in dimethyl sulfoxide. This colloidal sol is knife-coated onto thin stock paper and the impregnated paper is dried at a temperature of about 225° F. at a pressure of about 50 mm. of mercury. The impregnated paper is then calendered by pressing with a hot iron at about 320° F. The surface of the paper thus obtained is highly glazed. The paper is flexible and highly resistant to attack by water, other organic solvents, and microorganisms.

EXAMPLE II

The procedure set forth in Example I is repeated using a cyanoethyl ether of starch having a degree of substitution of 1.78 and a concentration of the starch in dimethyl sulfoxide of about 12%. Comparable results are obtained.

EXAMPLE III

The procedure set forth in Example I is repeated using a colloidal sol composed of 5% by weight of a cyanoethyl ether of starch having a degree of substitution of 1.51 in dimethyl sulfoxide. Comparable results are obtained.

EXAMPLE IV

A colloidal sol is prepared containing approximately 10% by weight of a cyanoethyl ether of starch having a degree of substitution of 1.95 in a mixture of dimethyl sulfoxide and water containing 20% by weight of water. A pressed cotton fabric weighing 1.9 oz. per sq. yd. and having 85 warp ends and 87 filing yarns per inch is impregnated by immersion in this colloidal sol. The impregnated fabric is dried at about 200° F. at 50 mm. of mercury for about one hour. The impregnated fabric is then given two passes through a three-roll friction calender maintained at a temperature of about 320° F. The calendered fabric has exceptional utility as tracing cloth. The surface of the fabric is smooth and highly glazed, it possesses a high dimensional stability, and is extremely resistant to water, organic solvents, and microorganisms.

EXAMPLE V

The procedure set forth in Example IV is repeated using a cyanoethyl ether of starch having a degree of substitution of 1.78. Comparable results are obtained.

EXAMPLE VI

The procedure set forth in Example IV is repeated using a colloidal sol composed of 15% by weight of a cyanoethyl ether of starch having a degree of substitution of 1.51 in a solvent mixture of dimethyl sulfoxide and water containing 25% by weight of water. Comparable results are obtained.

The colloidal sols of this invention can be applied to cellulosic materials in any of various ways well known to those skilled in the art. Knife-coating, roll-coating or immersion of the cellulosic material in the sol are all suitable methods of treatment. Repeated immersions with drying between immersions are particularly useful.

The quantity of the cyanoethyl ether of starch in the colloidal sol used to treat cellulosic materials in accordance with this invention can be substantially varied. In general, from about 5% to about 30% by weight of the cyanoethyl ether of starch based on total composition of the sol is used. Higher or lower concentrations can be used in particular applications if desired. If desired, plasticizers may be added to the colloidal sol to alter the flexibility characteristics of the finished impregnated product.

Various conditions of drying and calendering of the impregnated cellulosic material can be used. For example, the impregnated cellulosic material, such as cloth, may be dried at any temperature which drives off the solvent contained in the impregnating colloidal solution, but it is preferably dried at temperatures which allow the solvent to be released at such a rate that formation of blisters or bubbles on the treated surface is avoided. If speed of drying is unimportant, the impregnated cellulosic material can be dried at normal room temperatures. The impregnated material can be dried satisfactorily, for example, at temperatures varying between 200° F. to 250° F. at pressures of about 50 mm. of mercury.

Calendering may be carried out by using other means and conditions than those described above. Hand ironing and friction calendering are particularly suitable. In general, the impregnated material is super-calendered at temperatures and pressures which will cause the impregnant to soften or flow into a substantially continuous film or surface. Suitable temperatures for super-calendering vary between about 275° F. to about 330° F. Other temperatures can be used when different effects are desired.

What is claimed is:

1. A composition comprising a colloidal solution of a cyanoethyl ether of starch containing from about 1.5 to about 2.0 cyanoethyl ether groups per glucose unit in dimethyl sulfoxide.

2. A composition comprising a colloidal solution of a cyanoethyl ether of starch containing from about 1.5 to about 2.0 cyanoethyl ether groups per glucose unit in a mixture of dimethyl sulfoxide and water, water being present in any amount below a maximum of 25% by weight of said mixture for a starch containing about 2.0 cyanoethyl ether groups per glucose unit and in any amount below a maximum of 30% by weight of said mixture for a starch containing about 1.5 cyanoethyl ether groups per glucose unit.

3. A composition comprising a colloidal solution of a cyanoethyl ether of starch containing about 2.0 cyanoethyl ether groups per glucose unit in a mixture of dimethyl sulfoxide and water, water being present in any amount below a maximum of 25% by weight of said mixture.

4. A composition comprising a colloidal solution of a cyanoethyl ether of starch containing about 1.8 cyanoethyl ether groups per glucose unit in a mixture of dimethyl sulfoxide and water, water being present in any amount below a maximum of 27% by weight of said mixture.

5. A composition comprising a colloidal solution of a cyanoethyl ether of starch containing about 1.5 cyanoethyl ether groups per glucose unit in a mixture of dimethyl sulfoxide and water, water being present in any amount below a maximum of 30% by weight of said mixture.

6. A process for the preparation of improved cellulosic materials which comprises impregnating a cellulosic material with a colloidal solution of a cyanoethyl ether of starch containing from about 1.5 to about 2.0 cyanoethyl ether group per glucose unit in dimethyl sulfoxide, drying said impregnated material, and then calendering said cellulosic material.

7. A process for the preparation of improved cellulosic fabrics which comprises impregnating a cellulosic fabric with a colloidal solution of a cyanoethyl ether of starch containing from about 1.5 to about 2.0 cyanoethyl ether groups per glucose unit in dimethyl sulfoxide, drying said impregnated fabric, then calendering said cellulosic fabric.

8. A process for the preparation of improved cotton fabrics which comprises impregnating a cotton fabric with a colloidal solution of cyanoethyl ether of starch containing from about 1.5 to about 2.0 cyanoethyl ether groups per glucose unit in dimethyl sulfoxide, drying said impregnated cotton fabric, and then calendering said cotton fabric.

9. A process for treating paper which comprises impregnating said paper with a colloidal solution of a cyanoethyl ether of starch containing from about 1.5 to about 2.0 cyanoethyl ether groups per glucose unit in dimethyl sulfoxide, drying said impregnated paper, and then calendering said paper.

10. A process for the preparation of improved cellulosic materials which comprises impregnating a cellulosic material with a composition as defined in claim 2, drying said impregnated cellulosic material, and then calendering said cellulosic material.

11. A process for the preparation of improved cellulosic fabrics which comprises impregnating a cellulosic fabric with a composition as defined in claim 2, drying said impregnated cellulosic fabric, and then calendering said cellulosic fabric.

12. A process for the preparation of improved cotton fabrics which comprises impregnating a cotton fabric with a composition as defined in claim 2, drying said impregnated cotton fabric, and then calendering said cotton fabric.

13. A process of treating paper which comprises impregnating said paper with the composition of claim 2, drying said impregnated paper, and then calendering said paper.

14. A process for the preparation of improved cotton fabrics which comprises impregnating a cotton fabric with the composition of claim 3, drying said impregnated cotton fabric, and then calendering said cotton fabric.

15. A process for treating paper which comprises impregnating said paper with the composition of claim 3, drying said impregnated paper, and then calendering said paper.

16. A process for the preparation of improved cotton fabrics which comprises impregnating a cotton fabric with the composition of claim 4, drying said impregnated cotton fabric and then calendering said cotton fabric.

17. A process for the preparation of improved cotton fabrics which comprises impregnating a cotton fabric with the composition of claim 5, drying said impregnated cotton fabric, and then calendering said cotton fabric.

18. A process for treating paper which comprises impregnating paper with the composition of claim 5, drying said impregnated paper, and then calendering said paper.

References Cited in the file of this patent
UNITED STATES PATENTS

| | | |
|---|---|---|
| 2,316,128 | Bock et al. | Apr. 6, 1943 |
| 2,316,129 | Bock et al. | Apr. 6, 1943 |
| 2,375,847 | Houtz | May 15, 1945 |